(12) United States Patent
Müller

(10) Patent No.: US 10,286,823 B2
(45) Date of Patent: May 14, 2019

(54) DEVICE FOR THE VARIABLE FIXING OF A HEADREST TO A VEHICLE SEAT

(71) Applicant: ILLINOIS TOOL WORKS INC., Glenview, IL (US)

(72) Inventor: Manfred Müller, Georgensgmünd (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/538,673

(22) PCT Filed: Dec. 31, 2015

(86) PCT No.: PCT/US2015/068250
§ 371 (c)(1),
(2) Date: Jun. 22, 2017

(87) PCT Pub. No.: WO2016/118302
PCT Pub. Date: Jul. 28, 2016

(65) Prior Publication Data
US 2017/0349071 A1    Dec. 7, 2017

(30) Foreign Application Priority Data

Jan. 20, 2015 (DE) .................. 10 2015 100 752

(51) Int. Cl.
*B60N 2/818* (2018.01)
*B60N 2/815* (2018.01)
*B60N 2/897* (2018.01)

(52) U.S. Cl.
CPC ............. *B60N 2/818* (2018.02); *B60N 2/815* (2018.02); *B60N 2/897* (2018.02)

(58) Field of Classification Search
CPC ........ B60N 2/812; B60N 2/818; B60N 2/815; B60N 2/897
See application file for complete search history.

(56) References Cited

U.S. PATENT DOCUMENTS 3,512,833 A * 5/1970 Sugiura .................. B60N 2/818
297/410
4,674,796 A * 6/1987 Weinich ................. B60N 2/826
297/391

(Continued)

FOREIGN PATENT DOCUMENTS

CN    102529769    7/2012
DE    4222921    1/1994

(Continued)

OTHER PUBLICATIONS

PCT, International Search Report and Written Opinion, International Application No. PCT/US2015/068250; dated May 3, 2016, 10 pages.

*Primary Examiner* — Philip F Gabler
(74) *Attorney, Agent, or Firm* — Thompson Hine LLP

(57) ABSTRACT

A device for the variable fixing of a headrest to a vehicle seat, having a receptacle (1) forming a receiving space (5) a headrest support, and having a locking element (7) which, by a disengagement movement of a disengagement element (10), is movable from a locking position, in which a locking section (18) of the locking element (7) projects into the receiving space, into a release position, in which the locking section does not project into the receiving space or projects into the receiving space to a lesser extent than in the locking position and movement of the disengagement element leads along the longitudinal axis (9) of the receiving space (5). The movement of the disengagement element (10) can be effected by an actuation movement (12) of an actuation element (11), wherein the direction of the actuation movement (12) is oriented perpendicular to the longitudinal axis.

15 Claims, 2 Drawing Sheets

(56) References Cited

U.S. PATENT DOCUMENTS

Figure 1:
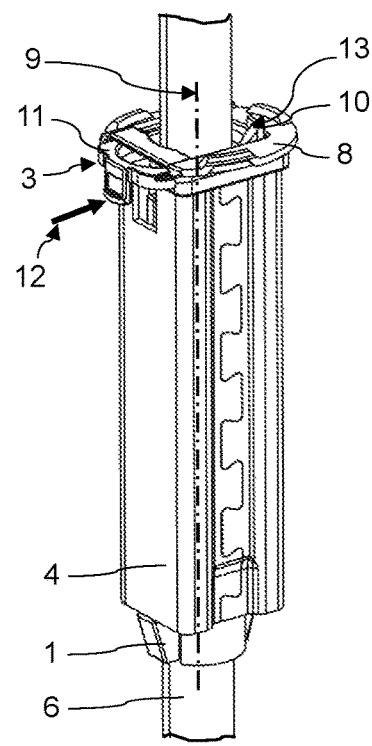

| | | | | |
|---|---|---|---|---|
| 4,854,642 A * | 8/1989 | Vidwans | ................ | B60N 2/818 297/410 |
| 5,860,703 A * | 1/1999 | Courtois | ................ | B60N 2/818 297/410 |
| 7,255,401 B2 * | 8/2007 | Yokoyama | ............. | B60N 2/818 297/410 |
| 2002/0038969 A1 * | 4/2002 | Whitmore | .............. | B60N 2/821 297/391 |
| 2006/0197366 A1 | 9/2006 | Saberan | | |
| 2009/0079250 A1 | 3/2009 | Follesa | | |
| 2010/0194167 A1 * | 8/2010 | Gans | ...................... | B60N 2/818 297/410 |
| 2016/0332545 A1 * | 11/2016 | Segura | ................. | H01R 13/631 |
| 2017/0334328 A1 * | 11/2017 | Muller | ................ | B60N 2/4814 |
| 2017/0349071 A1 * | 12/2017 | Muller | ................... | B60N 2/815 |

FOREIGN PATENT DOCUMENTS

| | | |
|---|---|---|
| DE | 19730911 | 1/1999 |
| DE | 102010055380 | 6/2012 |
| FR | 2978390 | 2/2013 |
| GB | 2511091 | 8/2014 |

\* cited by examiner

DEVICE FOR THE VARIABLE FIXING OF A HEADREST TO A VEHICLE SEAT

The invention relates to a device for the variable fixing of a headrest to a vehicle seat, having a receptacle which forms a receiving space for receiving a headrest support, and having a locking element which, by means of a disengagement movement of a disengagement element, is movable from a locking position, in which a locking section of the locking element projects into the receiving space, into a release position, in which the locking section does not project into the receiving space or projects into the receiving space to a lesser extent than in the locking position, wherein the movement of the disengagement element leads along the longitudinal axis of the receiving space.

A device of the type in question for the variable fixing of a headrest to a seat of a vehicle is known from DE 10 2010 055 380 B4. In the device described therein, the disengagement element serves at the same time as an actuation element, for which purpose the disengagement element has an actuation section which, when the device is integrated in a backrest of a vehicle seat, is arranged outside the backrest and can thereby be actuated manually. An unlocking of the headrest held in the device, with the aim of adjusting said headrest or of releasing same from the vehicle seat, therefore takes place by manual pressing of the actuation section of the disengagement element in the direction of the upper side of the backrest.

The device known from DE 10 2010 055 380 B4 is distinguished by a simple structural design, in particular because the locking system of the device substantially consists of just two components, namely an elastically deformable locking lock and the disengagement element. However, a disadvantage of said known device may be the direction in which the disengagement element has to be moved manually in order to effect the unlocking, which direction, depending on the integration of the device in the backrest of a vehicle seat and the shape of the headrest held by means of the device, may lead to poor accessibility and therefore to poor handleability of the actuating element. In addition, the manner of actuation of said device requires a distance to be provided between the actuation section, which is designed as an encircling collar, and the upper side of the backrest of the vehicle seat in the unloaded position of the disengagement element, which position corresponds to the locking position of the locking element, and this may have both visual and functional disadvantages.

The invention was based on the object of specifying a device for the variable fixing of a headrest to a seat of a vehicle, which device, with a structurally simple design, ensures as advantageous a handling as possible.

This object is achieved by means of a device as claimed in patent claim 1. A headrest system with such a device is the subject matter of patent claim 9, and a vehicle seat with such a headrest system is the subject matter of patent claim 10. Advantageous refinements of the device according to the invention and therefore of the headrest system according to the invention and also of the vehicle seat according to the invention are claimed in the further patent claims and result from the description below of the invention.

A device of the generic type for the variable fixing of a headrest to a vehicle seat, having a receptacle which forms a receiving space for receiving a headrest support, and having a locking element which, by means of a disengagement movement of a disengagement element, is movable from a locking position, in which a locking section of the locking element projects into the receiving space, into a release position, in which the locking section does not project into the receiving space or projects into the receiving space to a lesser extent than in the locking position, wherein the movement of the disengagement element leads along (and in particular parallel to or coaxially with respect to) the longitudinal axis of the receiving space is characterized, according to the invention, in that the movement of the disengagement element can be effected by an actuation movement of an actuation element, wherein the direction of the actuation movement is oriented transversely and in particular perpendicular (or radially) to the longitudinal axis.

The refinement according to the invention of such a device for the variable fixing of a headrest therefore provides the integration of a transmission, which is preferably designed as simply as possible, between the actuation element, which is manually actuable for example, and the disengagement element, wherein said transmission transmits the movement of the actuation element and the forces required for this purpose to the disengagement element but, in the process, the direction of movement changes. By means of the variability achieved in this manner in respect of the orientation of the actuation movement of the actuation element with respect to the direction of movability of the disengagement element, an advantageous positioning or alignment for the actuation element and/or the direction of the actuation movement can be achieved, and this, depending on the integration of the device in a headrest system and of said headrest system in a vehicle seat, can simplify the handling of the device, in particular for unlocking a headrest of the headrest system, which headrest is held in the device.

A headrest system according to the invention comprises, in addition to such a device, at least also a headrest which comprises at least one headrest support, wherein the headrest support is received within the receiving space of the receptacle in displaceable fashion (along the longitudinal axis of the receiving space) when the locking element of the device is situated in the release position and in fixed fashion (positively or non-positively) when the locking element is situated in the locking position.

A vehicle seat according to the invention is characterized in that such a headrest system is provided, wherein the receptacle of the device is at least partially integrated into a backrest of the vehicle seat.

In a preferred refinement of the device according to the invention, it can be provided that the locking element is of (functionally) elastically deformable design and is integrated into the device in such a manner that said locking element is deformed elastically when the locking section is situated in the release position, while said locking element is not deformed elastically or (preferably) is deformed elastically to a lesser extent when the locking section is situated in the locking position. A small elastic deformation of the locking element in the locking position can improve the security of the fixing of the headrest support in the device and/or can prevent an undesired formation of noise. By means of the elastic deformation of the locking element in the release position, an automatic resetting of the locking section into the locking position can be achieved when the actuation element is relieved of load. It can thereby be ensured that a headrest held in the device is always fixed whenever the actuation element is not actuated.

The elastic resetting action of the locking element which is elastically deformed in the release position can advantageously also be used to move the disengagement element and/or the actuation element back into the corresponding starting positions without a manual intervention or an additional resetting element being required for this purpose.

However, it may be advantageous for such an additional resetting element to be provided, which can be designed in particular in the form of a spring element, wherein the spring element loads the disengagement element (directly) into the initial position thereof, which corresponds to the locking position of the locking element. This can be formed advantageously on in particular on the structural refinement of the locking element, since the resetting action thereof can be dimensioned freely from the requirement of also being able to move the disengagement element and/or the actuation element back into the initial positions.

It is also possible, instead of or in addition to the disengagement element, to load the actuation element (directly) into the initial position thereof by means of a spring element. The disengagement element can then not only be moved into the initial position thereof by the resetting action of the locking element, but said disengagement element can also be coupled to the actuation element in a force-transmitting manner both in the direction of the actuation movement and in the opposite direction thereto such that a loading of the actuation element by means of the spring element is also transmitted to the disengagement element.

A structurally simple possibility of refining an elastically deformable locking element can provide the formation of said locking element from a bar which runs in a curved manner at least in sections and is of correspondingly thin dimensions (i.e. is wire-shaped), wherein at least a first section, in particular an end section, of the bar is held in the receptacle and a further section of the bar forms the locking section. Provision can preferably be made here for the two end sections of the bar to be held in the receptacle while a middle section of the bar forms the locking section. As a result, particularly good support of the bending moment on the receptacle is achieved and, consequently, the stability and functional reliability of the device as a whole are increased.

In a furthermore preferred refinement of the device according to the invention, it can be provided that the disengagement element makes contact with the locking element via a sliding surface which is oriented obliquely with respect to the direction of the disengagement movement and/or the actuation element makes contact with the disengagement element via a sliding surface which is oriented obliquely with respect to the direction of the actuation movement. This constitutes (in each case) a structurally simple refinement of a transmission deflecting the directions of the associated movements, which can be reflected in correspondingly low production costs for the device according to the invention. The (at least one) sliding surface can be formed here by the disengagement element and/or by the locking element or the actuation element and/or the disengagement element.

A furthermore preferred development of the device according to the invention can make provision for the disengagement element to be guided on the outside of the receptacle. Provision can likewise advantageously be made for the locking element to be held on the outside of the receptacle. This can permit as simple a structural refinement of the receptacle, the disengagement element and/or the locking element as possible and a simple installation of said elements.

Furthermore preferably, provision can be made for the actuation element to be arranged exclusively in a head section of the receptacle. "Head section" is understood here as meaning a section of the receptacle that, when the device is integrated in the backrest of a vehicle seat, is arranged outside the backrest and in particular rests on an upper side of the backrest while an integration section of the receptacle is arranged within the backrest. The arrangement of the actuation element exclusively in such a head section of the receptacle can lead to simple shaping for the receptacle and the actuation element.

The individual elements of the device according to the invention and of the headrest system and vehicle seat according to the invention can be of single- or multi-part design. It is therefore not required for the locking section to be a fixed component of the locking element. In particular, the locking element comprising the locking section also does not have to be of single-part design. Consequently, the locking section can also be a separate component which functionally interacts with a basic body of the locking element in order to form the locking element. However, a coupling may optionally be required between the basic body and the separate locking section in order to transmit a movement of the basic body, which movement is effected by the disengagement element, to the separate component forming the locking section.

The indefinite articles ("a" and "an"), in particular in the patent claims and in the above description explaining the patent claims in general, should be understood as such and not as numerals. Components correspondingly substantiated therewith should therefore be understood as meaning that said components are present at least once and may be present more than once.

Figure 2:
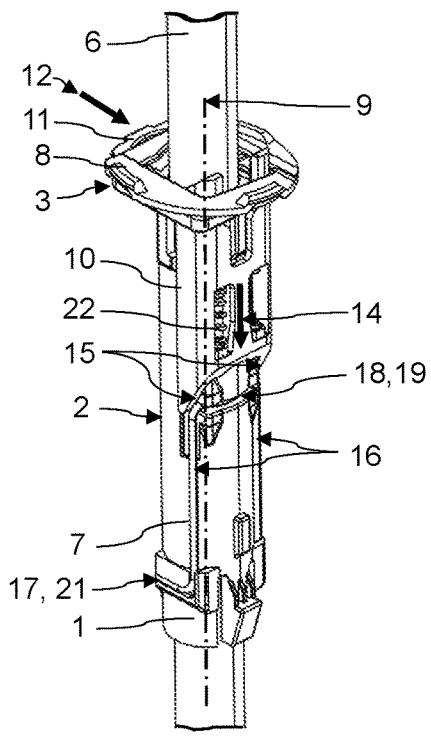
Figure 3:
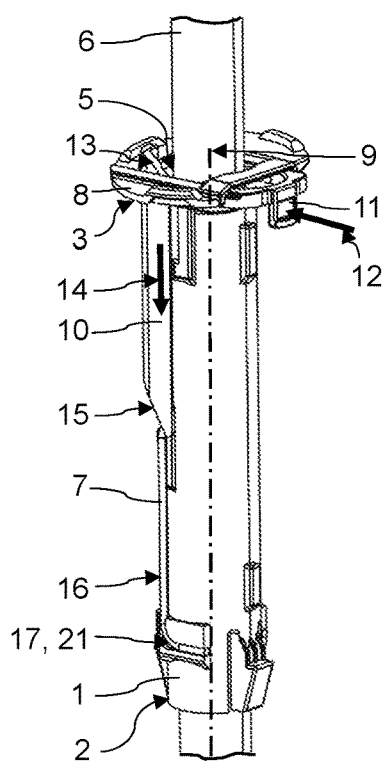
Figure 4:
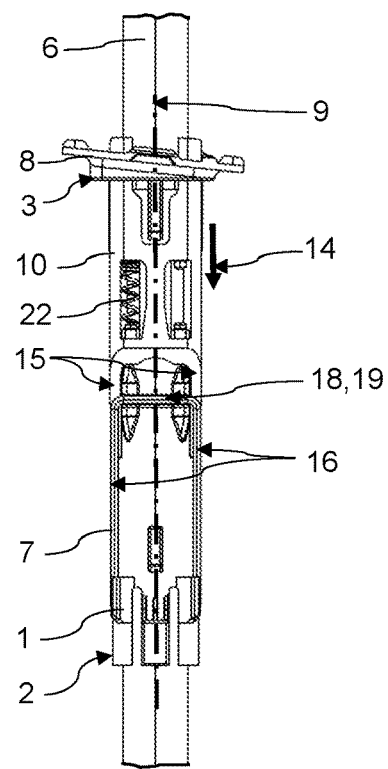
Figure 5:
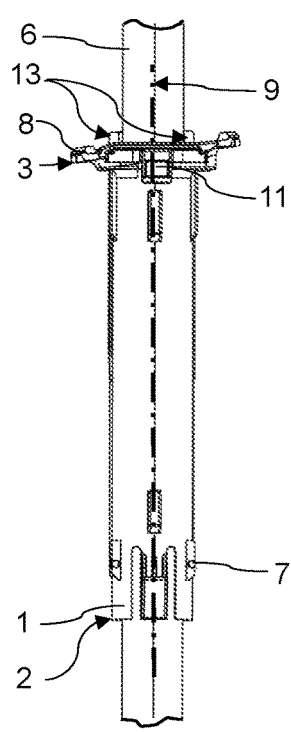
Figure 6:
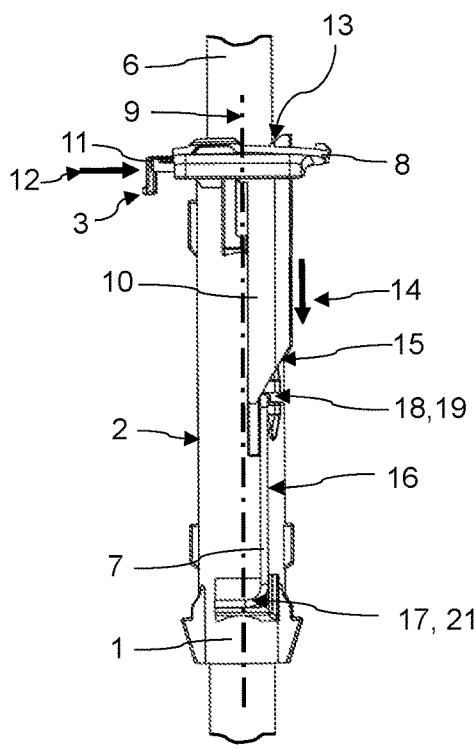
Figure 7:
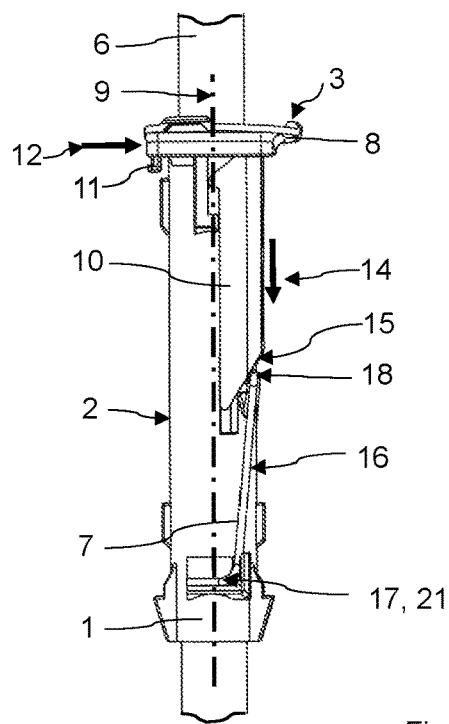
Figure 8:
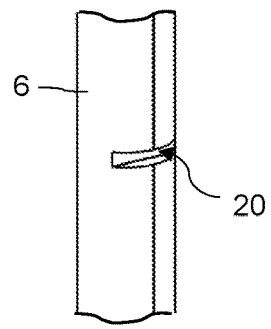

The invention is explained in more detail below with reference to an exemplary embodiment illustrated in the drawings. In the drawings:

FIG. 1: shows a headrest system according to the invention in a first perspective view;

FIG. 2: shows the headrest system according to FIG. 1 (but without a housing) in a second perspective view;

FIG. 3: shows the headrest system according to FIG. 2 in a third perspective view;

FIG. 4: shows the headrest system according to FIGS. 2 and 3 in a first side view;

FIG. 5: shows the headrest system according to FIGS. 2 to 4 in a second side view;

FIG. 6: shows the headrest system according to FIGS. 2 to 5 in a view from the front with the locking element in the locking position thereof;

FIG. 7: shows the headrest system according to FIG. 6 with the locking element in the release position thereof; and FIG. 8: shows a section of the headrest support of the headrest system in an isolated illustration.

The headrest system illustrated in the drawings comprises a device for the variable fixing of a headrest to a vehicle seat (not illustrated), and a headrest which is received in the device and of which only a headrest support 6 is illustrated. The headrest can comprise, in addition to a padded headrest part, two such headrest supports 6 which can run approximately parallel and are in each case received in a corresponding device.

The device comprises a receptacle 1 having a tubular integration section 2, which is of approximately hollow-cylindrical design, and a flat head section 3 which is arranged at an end of the integration section 2. The integration section 2 and a housing 4 (cf. FIG. 1) of the device, said housing substantially completely surrounding the integration section 2, are provided to be inserted and held in an integration space in a backrest of the vehicle seat while the head section 3 of the device is intended to be arranged outside the backrest and to rest with the lower side thereof on an upper side of the backrest.

The receptacle 1 forms a receiving space 5 which serves for receiving the headrest support 6, wherein the headrest support 6 is received within the receiving space 5 in displaceable fashion when a locking element 7 of the device is situated in a release position, and is received in positively fixed fashion when the locking element 7 is situated in a locking position.

The head section 3 of the receptacle 1 comprises a base part 8 which is fixedly connected to the integration section 2 of the receptacle 1, and a cover (not illustrated in the drawings). The base part 8 and the cover of the head section 3 form an interior space, within which an approximately U-shaped actuation element 11 is mounted in displaceable fashion. A functional section of the actuation element 11 is positioned here within said interior space while an actuation section of the actuation element 11 projects out of the head section 3. By manual actuation of the actuation element 11, the locking element 7, which is coupled to the latter via a disengagement element 10, can be brought from the locking position, as is illustrated in FIGS. 1 to 6, into the release position, as is illustrated in FIG. 7.

An actuation takes place by displacement of the actuation element 11 into the head section 3 and therefore perpendicular or radially to a longitudinal axis 9 of the receiving space 5, wherein two edges of the actuation element 11, which are arranged on the end side of each limb of the (U-shaped) actuation element 11, slide along first sliding surfaces 13 of the disengagement element 10, which sliding surfaces are oriented obliquely with respect to this direction of the actuation movement 12, as a result of which the movement of the actuation element 11 is converted into a movement of the disengagement element 10, which movement is oriented approximately parallel to the longitudinal axis 9 of the receiving space 5. Said movement of the disengagement element 10, which is guided on the outside of the integration section 2 of the receptacle 1, leads to a locking section 18 of the locking element 7 being deflected in a direction which is oriented approximately perpendicular or radially with respect to the longitudinal axis 9 of the receiving space 5. The locking section 18 is moved here from the locking position, in which said locking section is at least partially positioned within the receiving space 5 formed by the receptacle 1 (for which purpose the receptacle 1 forms a corresponding through opening 19; cf. FIG. 6), into a release position in which said locking section is moved completely out of the receiving space 5 (cf. FIG. 7). In the release position, the locking section 18 is brought out of engagement in one (of preferably a plurality of (otherwise not shown)) locking grooves 20 (cf. FIG. 8) of the headrest support 6. As a result, the headrest support 6 and therefore the headrest are no longer positionally fixed in the device 1, and the headrest support 6 can be displaced along the longitudinal axis 9 within the receiving space 5 or can be pulled completely out of the latter. In the release position of the locking element 7, the device therefore permits a height adjustment and removal of the headrest while, in the locking position, a designated positioning of the headrest relative to the backrest of the vehicle seat is secured by engagement of the locking section 18 in one of the locking grooves 20.

The deflection of the locking section 18 is effected by sliding regions of the locking element 7 along second sliding surfaces 15 of the disengagement element 10, which sliding surfaces are oriented obliquely with respect to the direction of the disengagement movement 14 of the disengagement element 10.

The locking section 18 is formed by a central section of the locking element 7, which central section is adjoined on both sides by a respective bending spring section 16 and then a holding section 17. In the transitions between said individual (rectilinearly extending) subsections, the locking element 7 is formed in each case in a manner angled through approximately 90°. By means of the two holding sections 17, the locking element 7 is held on the outside of the integration section 2 of the receptacle 1, for which purpose the integration section 2 forms two respectively L-shaped receiving depressions 21 in which the holding sections 17 and in each case a partial section of the bending spring sections 16, which partial section is positioned adjacent to the associated holding section 17, are received. The deflection of the locking section 18 effected by an actuation of the actuation element 11 is therefore associated with an elastic deformation of the locking element 7 (in particular in the region of the bending spring sections 16), which is preferably formed from metal and, for example, from spring steel.

The restoring effect of the locking element 7 that is effected by the elastic deformation ensures automatic resetting into the locking position as soon as the actuation element 11 is no longer actuated and a locking groove 20 is arranged adjacent to the locking section 18. The disengagement element 10 and the actuation element 11 are also moved back again into the (unloaded) initial positions as a consequence of the respective contact via the oblique sliding surfaces 13, 15.

The restoring action of the locking element 7 is assisted by an (additional) spring element 22 by means of which the disengagement element 10 is loaded directly into the initial position thereof in which said disengagement element does not deflect the locking section of the locking element. For this purpose, the spring element 22, which is designed in the form of a helical spring, is held under tension between the disengagement element 10 and the receptacle 1.

The restoring action of the locking element 7 and of the spring element 22 into the locking or initial positions not only ensures that a height adjustment of the headrest is possible only if this is actively initiated by pressing the actuation element 11, but also, as a result, automatic latching of the locking section 18 into one of the locking grooves 20 of the headrest support 6 is achieved as soon as the corresponding locking groove 20 is positioned adjacent to the locking section 18 within the receiving space 5.

The receptacle 1, which is formed integrally, for example the disengagement element 10 and the actuation element 11, are preferably formed from plastic and can be produced, for example, by injection molding. The cover of the head section 3 can advantageously likewise be formed as an integral component. This can also take place by means of injection molding, for which purpose said cover is preferably shaped in such a manner that the cover essentially does not form any undercuts.

After the actuation element 11 is installed, the cover can be connected releasably or non-releasably to the base part 8 of the head section 3. A releasable connection can be achieved by means of a latching connection. A non-releasable connection can take place in particular in an integrally bonded manner (for example by adhesive bonding or welding) or positively, for example by means of a latching connection (which cannot be released without destruction).

The design of the locking element 7 as a wire-shaped bending component constitutes a structurally simple and cost-effectively producible design. In addition, said locking element can be mounted in a simple manner by the holding sections 17 of the locking element 7 being bent up elastically for the installation of the device and being positioned adjacent to the receiving depressions 21 in which said holding sections then automatically engage as a result of the restoring action effected by the bending-up.

The housing 4 of the device is preferably formed from (sheet) metal since high loads, as may occur, for example, by the impact of a head of a vehicle occupant in the event of the vehicle accommodating the vehicle seat being involved in an accident, are intended to be supported on a supporting structure of the backrest of the vehicle seat by means of the housing 4.

LIST OF REFERENCE SIGNS

1 Receptacle
2 Integration section
3 Head section
4 Housing
5 Receiving space
6 Headrest support
7 Locking element
8 Base part
9 Longitudinal axis of the receiving space
10 Disengagement element
11 Actuation element
12 Direction of the actuation movement
13 First sliding surface of the disengagement element
14 Direction of the disengagement movement
15 Second sliding surface of the disengagement element
16 Bending spring section of the locking element
17 Holding section of the locking element
18 Locking section of the locking element
19 Through opening of the receptacle
20 Locking groove
21 Receiving depression
22 Spring element

The invention claimed is:

1. A device for the variable fixing of a headrest to a vehicle seat, having a receptacle which forms a receiving space for receiving a headrest support, and having a locking element which, by means of a disengagement movement of a disengagement element, is movable from a locking position, in which a locking section of the locking element projects into the receiving space, into a release position, in which the locking section does not project into the receiving space or projects into the receiving space to a lesser extent than in the locking position, wherein the disengagement movement of the disengagement element is in a direction orientated approximately parallel to a longitudinal axis of the receiving space, characterized in that the disengagement movement of the disengagement element can be effected by means of an actuation movement of an actuation element, wherein a direction of the actuation movement is oriented perpendicular to the longitudinal axis.

2. The device as claimed in claim 1, characterized in that the direction of the actuation movement is oriented perpendicular to the longitudinal axis.

3. The device as claimed in claim 1, characterized in that the locking element is elastically deformed when the locking section is situated in the release position.

4. The device as claimed in claim 3, characterized in that the locking element is formed from a bar which runs in a curved manner at least in sections, wherein at least a first section of the bar is held in or on the receptacle and a further section of the bar forms the locking section.

5. The device as claimed in claim 1, characterized in that the disengagement element makes contact with the locking element via a sliding surface which is oriented obliquely with respect to the direction of the disengagement movement and/or the actuation element makes contact with the disengagement element via a sliding surface which is oriented obliquely with respect to the direction of the actuation movement.

6. The device as claimed in claim 1, characterized in that the disengagement element is loaded into an initial position, which corresponds to the locking position, by means of a spring element.

7. The device as claimed in claim 1, characterized in that the disengagement element is guided on the outside of the receptacle and/or the locking element is held on the outside of the receptacle.

8. The device as claimed in claim 1, characterized in that the actuation element is arranged exclusively in a head section of the receptacle.

9. A headrest system having a headrest which comprises a headrest support and having a device as claimed in claim 1, wherein the headrest support is received within the receiving space of the receptacle in displaceable fashion when the locking element is situated in the release position and in fixed fashion when the locking element is situated in the locking position.

10. A vehicle seat having a headrest system as claimed in claim 9, wherein the receptacle of the device is at least partially integrated into a backrest of the vehicle seat.

11. A device for the variable fixing of a headrest to a vehicle seat, the device having a receptacle forming a receiving space for receiving a headrest support, and having a locking element movable, by a disengagement movement of a disengagement element, from a locking position, in which a locking section of the locking element projects into the receiving space, into a release position, in which the locking section does not project into the receiving space or projects into the receiving space to a lesser extent than in the locking position, wherein a direction of the disengagement movement of the disengagement element is orientated approximately parallel to a longitudinal axis of the receiving space, wherein the disengagement movement of the disengagement element can be effected by means of an actuation movement of an actuation element, wherein a direction of the actuation movement is oriented perpendicular to the longitudinal axis.

12. The device as claimed in claim 11, wherein the locking element is elastically deformed when the locking section is situated in the release position.

13. The device as claimed in claim 12, wherein the locking element is formed from a bar which runs in a curved manner at least in sections, wherein at least a first section of the bar is held in or on the receptacle and a further section of the bar forms the locking section.

14. The device as claimed in claim 11, wherein (i) the disengagement element makes contact with the locking element via a sliding surface that is oriented obliquely with respect to the direction of the disengagement movement and/or (ii) the actuation element makes contact with the disengagement element via a sliding surface that is oriented obliquely with respect to the direction of the actuation movement.

15. The device as claimed in claim 1, wherein the disengagement element is biased into an initial position, which corresponds to the locking position, by a spring element.

* * * * *